United States Patent

[11] 3,537,559

[72] Inventor Daniel R. McNeal, Jr.
Gwynedd, Pennsylvania
[21] Appl. No. 797,559
[22] Filed Feb. 7, 1969
[45] Patented Nov. 3, 1970
[73] Assignee Andale Company
Lansdale, Pennsylvania
a corporation of Pennsylvania

[54] SPRING FOR USE IN LIMITING TORQUE IN VALVE OPERATORS
3 Claims, 3 Drawing Figs.
[52] U.S. Cl. ..................................................... 192/150;
74/801; 251/134
[51] Int. Cl. ..................................................... F16p 7/02;
F16h 1/28; F16k 31/05
[50] Field of Search ......................................... 251/134,
26; 74/801; 192/150; 74/626

[56] References Cited
UNITED STATES PATENTS
1,883,164 10/1932 Vassakos ...................... 192/150
2,525,915 10/1950 Kuhn ............................ 192/150X
2,690,685 10/1954 Donandt ....................... 74/801
2,825,247 3/1958 Haworth et al. .............. 74/801
2,844,052 7/1958 Stoeckickt ..................... 74/801
3,085,781 4/1963 La Pointe ..................... 251/134X
3,429,406 2/1969 Cary ............................. 192/150X Primary Examiner—Arthur T. McKeon
Attorney—Synnestvedt and Lechner ABSTRACT: Valve equipment including a rotative valve operating mechanism and power means for driving the rotative operating mechanism including a motor and gearing interconnecting the motor and the operating mechanism, the gearing incorporating a gear element serving as a reaction point during the transmission of torque through the gearing and mounted with freedom for limited movement under the influence of such torque transmission, together with a spring for restraining the gear element as against such movement, the spring comprising a tapered rod mounted in cantilever from its large end and having its small end in engagement with the movable gear element.

Patented Nov. 3, 1970
3,537,559
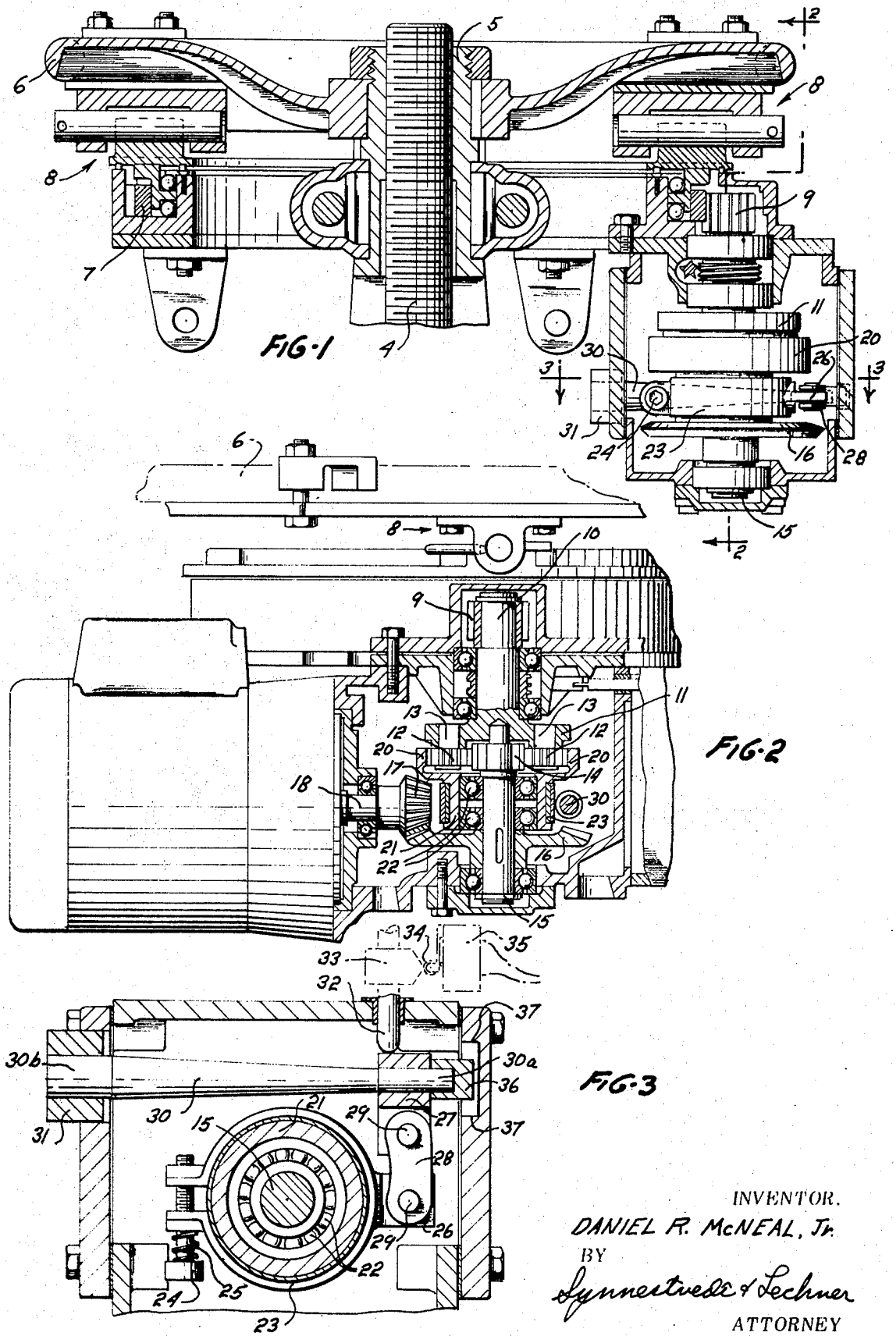
INVENTOR.
DANIEL R. McNEAL, Jr.
BY
Synnestvedt & Lechner
ATTORNEY

SPRING FOR USE IN LIMITING TORQUE IN VALVE OPERATORS

This invention relates to valve equipment and is particularly concerned with valve equipment in which the valve is adapted to be power operated through rotative mechanism. Valves of this type commonly comprise a valve member which is movable in either direction through a control range, usually by reciprocating motion between predetermined limits.

The power mechanism commonly includes a motor and gearing. As will readily be understood, it is important in a system of this kind to ensure shutoff of the motor, and thus to prevent abnormal rise in torque, at the end of each valve operating stroke, in order to prevent damage either to parts of the valve itself or to parts of the operating mechanism.

For the above general purpose it has been known, for instance in Thomas et al. U.S. Pat. No. 2,815,922, to provide a gearing system in the power operating mechanism including a gear element or member which serves as a reaction point for transmission of torque through the gearing, which element is mounted with freedom for limited movement under the influence of such torque transmission, the construction further including a spring for yieldingly restraining the motion under the influence of such torque transmission. One or more limit switches are associated with the movable element of the gearing, these switches being operated within the range of motion permitted by the spring in order to shut off the motor and thus avoid excessive increase in torque at the ends of the valve stroke.

The present invention is primarily concerned with in improved form of spring for use in an arrangement of the kind above referred to. Having in mind that in many power operated valve installations the valves are operated frequently and the springs are therefore frequently flexed, the invention provides a form of spring in which breakage from fatigue of the spring is diminished to such an extent that the spring replacement heretofore required is virtually eliminated.

Another object of the present invention is the provision of a spring for the purposes referred to having identical flexing characteristics in opposite directions, so that in a reversibly operable valve operating mechanism the spring action will be the same with respect to either sense of rotation of the operating gearing.

How the foregoing and other objects and advantages are attained together with others which will occur to those skilled in the art will appear more fully from the following description referring to the accompanying drawing illustrating a preferred embodiment of the invention, and in which:

FIG. 1 is a vertical or axial sectional view through certain portions of a valve operating mechanism including the threaded valve stem of the kind used with a reciprocable valve;

FIG. 2 is a vertical sectional view taken generally as indicated by the section line 2-2 on FIG. 1, this view showing certain of the parts, including the motor, in elevation; and FIG. 3 is a fragmentary horizontal sectional view through certain portions of the mechanism, taken as indicated by the section line 3-3 of FIG. 1, this view also diagrammatically indicating a motor limit switch associated with the movable gear element.

Although the improved torque limiting spring arrangement of the present invention is usable with a wide variety of valve constructions, for purposes of illustration, it is herein illustrated in association with the general type of power operating mechanism for a valve of the kind shown in the Thomas et al. patent above identified, i.e., an arrangement in which a threaded valve stem or rod 4 extends from the valve itself for cooperation with the rotative internally threaded sleeve or nut 5 having an operating handwheel 6 keyed thereto.

In this type of construction, as is more fully disclosed in the Thomas et al. patent referred to, the power mechanism is arranged to be connected with the handwheel, so as to effect powered actuation of the valve by rotating the handwheel. Various details of the construction of the parts for effecting power rotation of the handwheel and thus powered operation of the valve need not be considered herein as they form no part of the present invention per se. However, it is to be noted that the general arrangement comprises a driven ring gear 7 which is connected through mechanisms generally indicated at 8 with the handwheel in order to rotate the handwheel when the ring gear 7 is power driven.

The ring gear meshes with a pinion 9 mounted on a shaft 10 the lower end of which is enlarged to provide a planetary gear carrier or spider 11. Planet gears 12 are mounted on the spider 11 by the shafts 13.

A central or sun gear 14 of this planetary system is mounted upon a shaft 15 carrying a bevel gear 16 meshing with the pinion 17 which is fixed on the shaft 18 of the driving motor 19. Motor 19 is preferably a reversible motor in order to provide for operation of the valve operating mechanism in either direction.

The gearing system further includes ring gear 20 having a hub sleeve 21 journaled by bearings 22 upon the shaft 15, so that the gearing comprises an epicyclic system which is operative to transmit torque from the motor 19 through the gearing to the ring gear 7 connected with the handwheel, provided the ring gear 20 is restrained as against rotation. The gearing element or member 20 thus serves as a reaction point for the transmission of torque through the gearing when the valve is operated.

For the purpose of preventing extensive turning of the ring gear 20 during the transmission of power, a friction band 23 surrounds the hub 21, this band being split and being provided with an adjustment screw 24 with a compression spring 25 arranged so as to yieldingly tighten the friction band 23 against the hub sleeve 21. The band 23 has a lug 26 at one side which is connected with the block 27 by means of a link 28 and pivots 29. Block 27 is provided with an aperture receiving the cylindrical end portion 30a of the torque limiting spring which comprises a tapered rod 30 having a cylindrical portion 30b at its other end. The cylindrical end portion 30a is at the smaller end of the tapered spring rod and the cylindrical portion 30b at the larger end thereof. The latter cylindrical portion is received and mounted in a socket 31 rigidly fastened in a portion of the casing for the equipment, so that the tapered spring 30 is mounted or supported from its larger end in cantilever. The spring thus tends to yieldingly restrain turning movement of the split band 23 which in turn, because of its frictional engagement with the hub sleeve 21, similarly yieldingly restrains turning motion of the ring gear 20. The ring gear 20 thus serves as the reaction point for the transmission of torque through the gearing system and, upon substantial increase of torque in either direction, the ring gear will move to a limited extent and in doing so will deflect the free end of the cantilever spring in one direction or the other, depending upon the direction of rotation of the gearing.

The foregoing action is desirable in the operation of the power means because it provides a cushion to absorb shocks upon starting of the motor. In addition the arrangement is advantageously used in connection with limit switches for the motor. For this purpose, a plunger 32 is mounted for axial sliding movement with one end positioned adjacent to the block 27 in which the free end 30a of the spring rod 30 is received, and the plunger 32 is desirably yieldingly urged toward the block 27, as by means of a spring (not shown). The plunger 32 carries a cam diagrammatically indicated at 33 adapted to cooperate with a cam follower 34 serving as an actuating element for the switch 35 which is adapted to be coupled into the power circuit for the motor 19 in order to open or close the power circuit, according to the position of the cam 33. Upon reaching the limit of the stroke of the valve, the rise in torque will result in deflection of the spring rod 30 and this in turn will shift the control rod 32, thereby actuating the switch 35 to open the motor circuit and thus stop the motor. The elements 33, 34 and 35 may serve for motor shutoff in one direction of operation of the motor, and similar parts may be associated with rod 32 in positions providing for shutoff of the motor when operating in the opposite direction of rotation. In this latter event it will be understood that the deflection of the spring rod 30 will take place in the opposite direction.

In order to limit the deflection of the spring 30 and thus the motion of the friction band 23 and associated parts, a stop element 36 is provided at the free end of the spring rod 30 in position to abut one or the other of the limiting stops 37-37 provided in the adjacent portion of the casing or frame structure.

The provision of the friction band 23 surrounding the hub 21 of the gear 20 provides an overload safety or limiting device, so that the ring gear 20 may rotate with respect to the friction band in the event that the torque or load exceeds the value represented by the deflection of the spring which would bring the stop element 36 into contact with either one of the abutments 37. In this way in the event of failure of the limiting switches, damage to various parts will be avoided.

The spring arrangement of the present invention is highly advantageous in a system for limiting the operation of a power drive mechanism for a valve, for several reasons. In the first place, the employment of a tapered rod as the spring element, with the rod mounted or fixed at its large end in cantilever results in a distribution of the deflection loads or bending moments throughout the length of the spring element, instead of being concentrated at the fixed end. Therefore, the fatigue life of the spring is almost infinite and the spring will not weaken or break adjacent the mounting as a result of fatigue. This is of especial importance in many valve arrangements employing operating means because of the frequency of operation thereof.

The tapered spring rod is also desirable because the spring characteristics are uniform with respect to deflection in two opposite directions and, indeed, with respect to deflection in two opposite directions in any radial plane containing the axis of the spring. There is therefore no necessity for positioning the spring about its axis in any particular position because it will manifest uniform bidirectional characteristics in any position in which it is installed. Moreover, because of the symmetry of the spring about its longitudinal axis, the spring will not tend to take a set in one direction as compared with another. Therefore, even where the spring is utilized to restrain the gear element constituting the reaction point for the torque transmission through the gearing in both directions, there will be no tendency, over a period of use, for the action to become irregular or nonsymmetrical in one direction as compared with the other.

Still further the spring rod of the invention is highly desirable because of its simplicity and ease of manufacture, particularly when having in mind the fact that the spring rod stock is readily available from which the tapered springs may be fabricated. The spring construction of the present invention also facilitates the fabrication of springs of high strength, especially as compared with compression springs.

I claim:

1. Valve equipment comprising rotative valve operating mechanism, power means for driving the rotative operating mechanism including a motor and gearing interconnecting the motor and the operating mechanism, the gearing including a gear member serving as a reaction point for transmission of torque through the gearing and mounted with freedom for limited movement under the influence of such torque transmission, and yielding means for restraining said member as against said movement including a spring comprising a tapered rod fixedly mounted at one end and having its other end in engagement with said member.

2. Valve equipment as defined in claim 1 and further including a limit switch for the motor operable by the spring-restrained movement of said gear member.

3. Valve equipment comprising rotative valve operating mechanism, reversibly operable power means for driving the rotative operating mechanism including a motor and gearing interconnecting the motor and the operating mechanism, the gearing including a member serving as a reaction point for transmission of torque through the gearing in either sense of rotation and mounted with freedom for limited movement in either direction from a mid position under the influence of such torque transmission, and yielding means acting to center said member in said mid position as against movement in either direction including a spring comprising a substantially straight tapered rod fixedly mounted at its large end and having its small end in engagement with said member.